US008806497B2

(12) United States Patent
Sinz

(10) Patent No.: US 8,806,497 B2
(45) Date of Patent: Aug. 12, 2014

(54) SYSTEM AND METHOD FOR ALTERING THE WORK DEFINITIONS IN AN ITERATIVE PARALLEL OPPORTUNISTIC WORK STEALING SCHEDULER

(75) Inventor: Michael P. Sinz, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 701 days.

(21) Appl. No.: 12/718,471

(22) Filed: Mar. 5, 2010

(65) Prior Publication Data

US 2011/0219378 A1    Sep. 8, 2011

(51) Int. Cl.
*G06F 9/46* (2006.01)
*G06F 9/48* (2006.01)
*G06F 9/50* (2006.01)

(52) U.S. Cl.
CPC ............... *G06F 9/46* (2013.01); *G06F 9/4881* (2013.01); *G06F 9/4843* (2013.01); *G06F 9/5066* (2013.01)
USPC ............ 718/102; 718/100; 718/101; 718/104

(58) Field of Classification Search
CPC ....... G06F 9/46; G06F 9/4881; G06F 9/4843; G06F 9/3851; G06F 9/4887; G06F 9/52; G06F 9/50; G06F 9/5066
USPC .................................. 718/102, 104, 100, 101
See application file for complete search history.

(56) References Cited

U.S. PATENT DOCUMENTS

| 6,823,351 | B1* | 11/2004 | Flood et al. ........................... 1/1 |
| 7,165,252 | B1* | 1/2007 | Xu ................................. 718/102 |
| 7,284,244 | B1 | 10/2007 | Sankaranarayan et al. |
| 7,395,536 | B2* | 7/2008 | Verbeke et al. ............... 718/100 |
| 7,461,376 | B2 | 12/2008 | Geye et al. |
| 7,565,398 | B2 | 7/2009 | Ashok et al. |
| 7,743,376 | B2* | 6/2010 | Selvaggi et al. .............. 718/100 |
| 7,779,222 | B1* | 8/2010 | Lev et al. ...................... 711/170 |
| 8,069,446 | B2* | 11/2011 | Zhao et al. .................... 718/104 |
| 8,108,876 | B2* | 1/2012 | Arimilli et al. ............... 718/105 |
| 2004/0088702 | A1* | 5/2004 | Garthwaite et al. .......... 718/100 |
| 2008/0244588 | A1 | 10/2008 | Leiserson et al. |

(Continued)

OTHER PUBLICATIONS

Dynamic Processor Allocation for Adaptively Parallel Work-Stealing Jobs—Published Date: Sep. 2004 http://people.csail.mit.edu/sidsen/sid-thesis.pdf (82 pages).
A Dynamic-Sized Nonblocking Work Stealing Deque—Published Date: Dec. 28, 2005 http://www.cs.bgu.ac.il/~hendlerd/papers/dynamic-size-deque.pdf (19 pages).

(Continued)

*Primary Examiner* — Meng An
*Assistant Examiner* — Abu Ghaffari
(74) *Attorney, Agent, or Firm* — Stephen Wight; Raghu Chinagudabha; Micky Minhas

(57) ABSTRACT

The scheduling of a group of work units across multiple computerized worker processes. A group of work units is defined and assigned to a first worker. The worker uses the definition of the group of work units to determine when processing is completed on the group of work units. Stealing workers may steal work from the first worker, and steal from the group of work initially assigned to the first worker, by altering the definition of the group of work units assigned to the first worker. The altered definition results in the first worker never completing a subset of the work units original assigned to the first worker, thereby allowing the stealing worker to complete work on that subset of work units. The process may perhaps be performed recursively in that the stealing worker may have some of its work stolen in the same way.

7 Claims, 8 Drawing Sheets

(56) References Cited

U.S. PATENT DOCUMENTS

| | | |
|---|---|---|
| 2009/0125882 A1 | 5/2009 | Frigo et al. |
| 2009/0172669 A1* | 7/2009 | Bobak et al. .................. 718/100 |
| 2009/0183157 A1 | 7/2009 | Tran et al. |
| 2009/0288086 A1 | 11/2009 | Ringseth et al. |
| 2010/0031267 A1* | 2/2010 | Maessen et al. .............. 718/105 |

OTHER PUBLICATIONS

IBM WebSphere Extended Deployment and Advanced IBM Power Virtualization—Published Date: Jan. 2006 http://www-03.ibm.com/servers/enable/site/peducation/wp/a1de/a1de.pdf (10 pages).

An Empirical Evaluation of Work Stealing with Parallelism Feedback—Published Date: Jul. 24, 2006 http://people.csail.mit.edu/kunal/adapt-exp.pdf (10 pages).

* cited by examiner

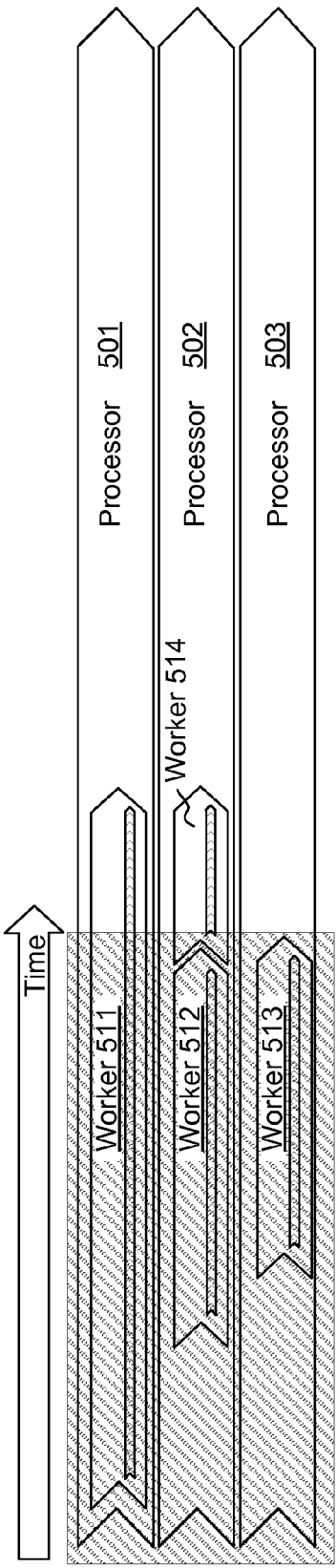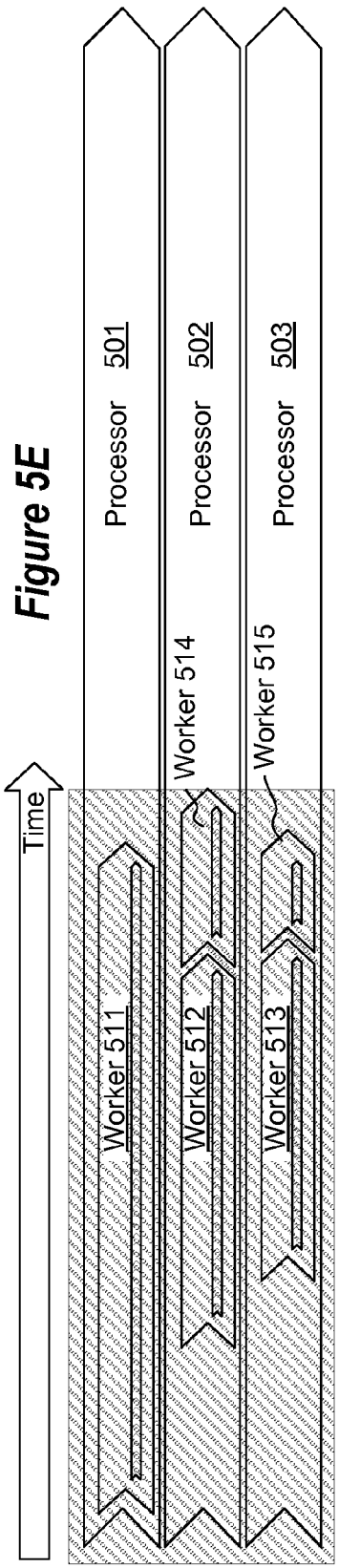

SYSTEM AND METHOD FOR ALTERING THE WORK DEFINITIONS IN AN ITERATIVE PARALLEL OPPORTUNISTIC WORK STEALING SCHEDULER

BACKGROUND

Multi-processor computing systems are capable of executing multiple threads concurrently in a process often called parallel processing. Each processor has one active worker at a time, where a worker is a processor in combination with the contextual data for the processor. Such contextual data may be, for example, the content of the processor registers. In dynamic systems that have multiple workloads and many processors, scheduling data parallel operations has some difficulties.

One difficulty is that in a dynamic system, the number of available processors for a given parallel application is not predetermined since it cannot be reliably predicted when and for how long any particular processors may be preempted for work in other parts of the system. Since the availability of resources comes and goes as other requests are serviced, it is costly to reserve resources for operations that will occur infrequently.

Secondly, many times, the level of effort an individual work unit or group of units will take is data-dependent and thus cannot be predicted in advance. If one were to try and predetermine the execution costs, then enough resources would be used to account for the worst case. When resources are reserved ahead of time based on a worst case analysis, the reserved resource will go wasted when the worst case is not encountered.

BRIEF SUMMARY

At least one embodiment described herein relates to the scheduling of a group of work units across multiple computerized worker processes. A group of work units is defined and assigned to a first worker. The worker uses the definition of the group of work units to determine when processing is completed on the group of work units. Stealing workers may steal work from the first worker, and steal from the group of work initially assigned to the first worker, by altering the definition of the group of work units assigned to the first worker. The altered definition results in the first worker never completing a subset of the work units originally assigned to the first worker, thereby allowing the stealing worker to complete work on that subset of work units. The process may perhaps be performed recursively in that the stealing worker may have some of its work stolen in the same way, and any given worker may have its work stolen in this manner zero, one, or multiple times. The stealing is opportunistic as once workers have the opportunity to steal work (e.g., the worker has complete their previously assigned work units), they proceed to steal work from other workers. Thus, by stealing work opportunistically, the workers can assist each other with their workloads thereby accomplishing the work efficiently. In some embodiments, the stealing is accomplished efficiently by having the stealing worker (rather than the worker being stolen from) bare the cost of stealing.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 5A through 5F illustrate an example time progression in an example scenario in which a work group is completed by three processors using workers that opportunistically steal work from each other.

DETAILED DESCRIPTION

In accordance with embodiments described herein, the scheduling of work units is described in a manner that allows worker processes to opportunistically take work (called "steal work" in the art) from other worker processes as the stealing worker becomes available to do so. First, some introductory discussion regarding computing systems will be described with respect to FIG. 1. Then, various embodiments of the scheduling will be described with reference to FIGS. 2 through 6.

Figure 1:
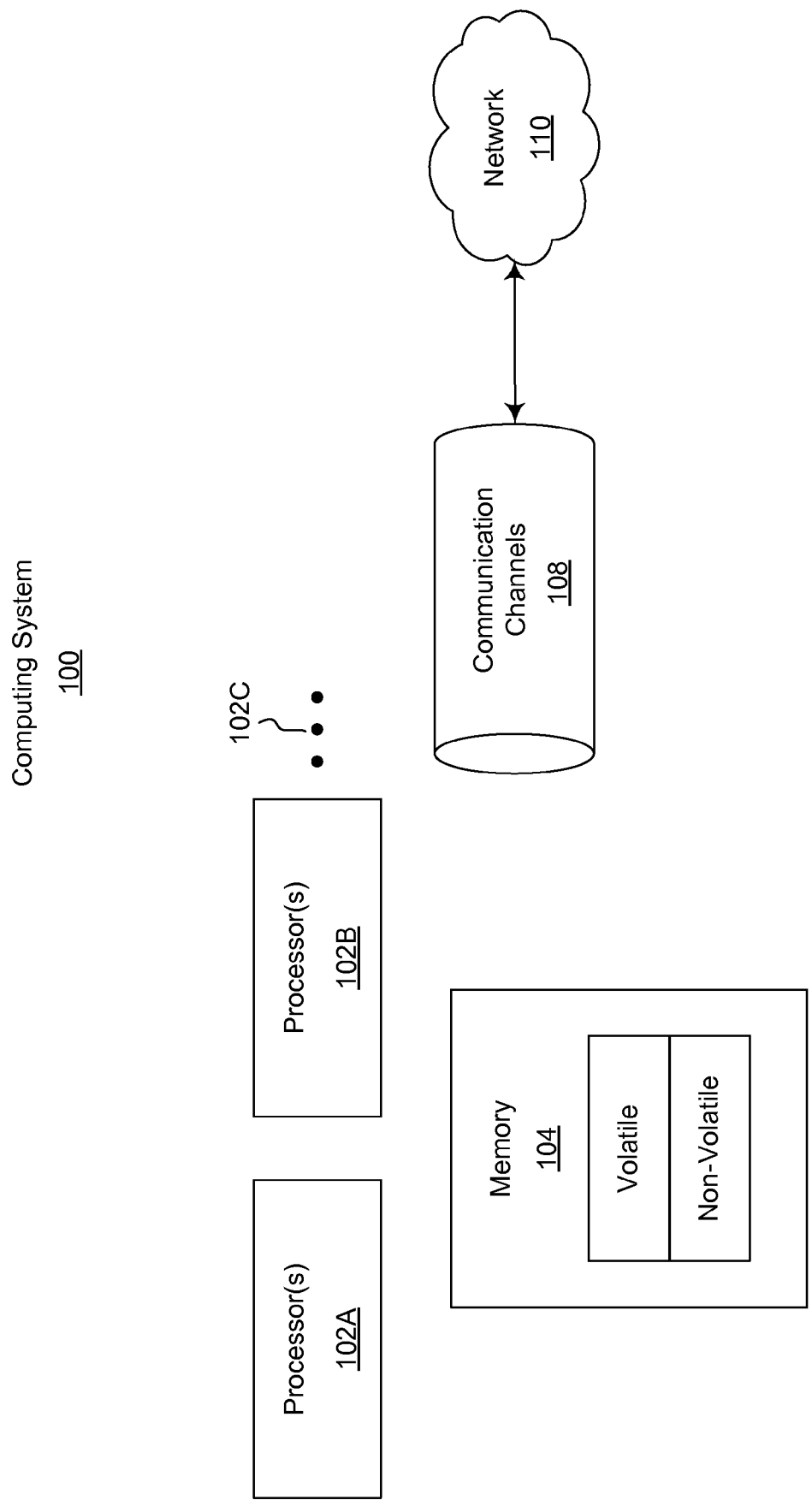
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, a computing system 100 includes multiple processing unit 102 and memory 104. For instance, the processing units 102 include processing unit 102A and processing unit 102B as well as potentially other processing units as represented by the ellipses 102C. Some computing systems include four or even more processing units, with some computing systems even having hundreds or thousands of processing units. Each processor is capable of hosting one active worker process at a time.

The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media or "transitory" media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical non-transitory storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. The computer-executable instructions cause the computer or processing device to perform the function or group of functions because the computer-executable instructions have a certain structure. If digitally represented, for example, such structures may represent one or more bits of information. In the case of magnetic storage media, for example, such as structure may be a level and/or orientation of magnetism on the media at predetermined parts of the magnetic storage media. In the case of optical storage media, for example, such a structure may be a level of reflectivity of the media at particular predetermined parts of the optical media.

Figure 2:
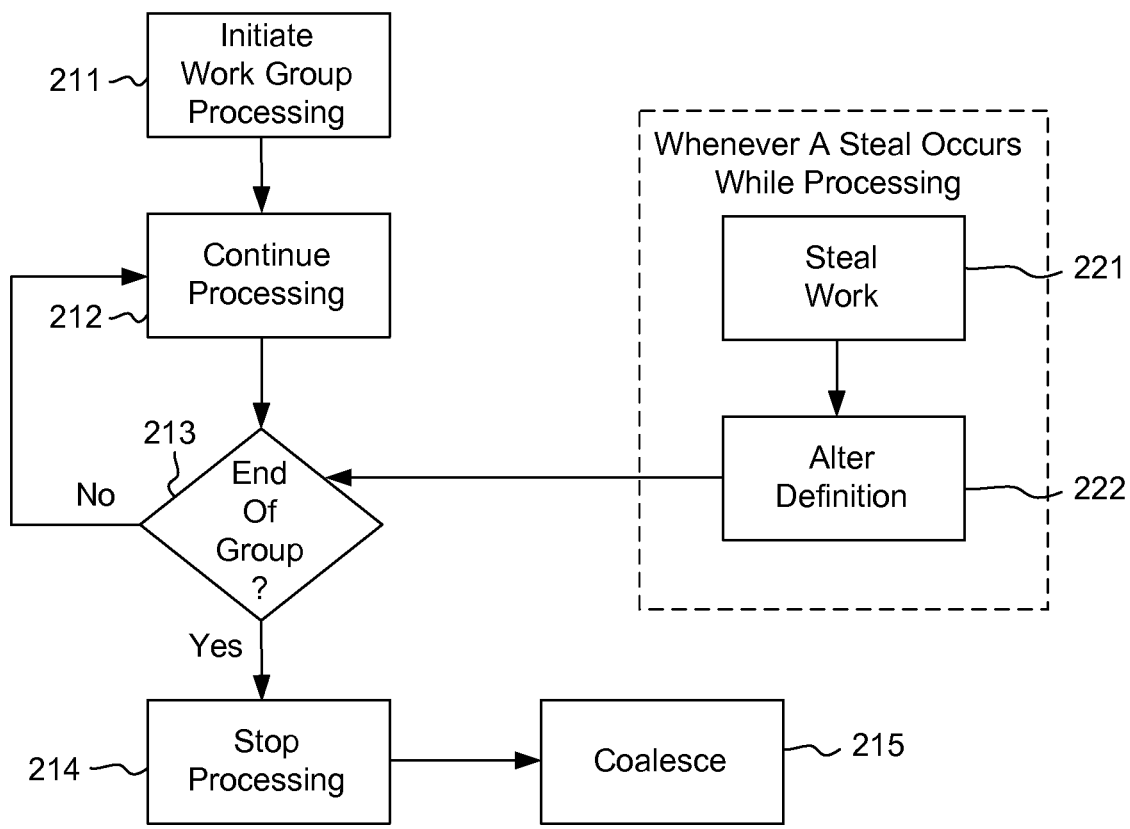
FIG. 2 illustrates a flowchart of a method for scheduling a work unit group across multiple computerized worker processes.

FIG. 2 illustrates a flowchart of a method 200 for scheduling a work unit group across multiple computerized worker processes. The method 200 may, for example, be performed by the computing system 100 of FIG. 1 by, for example, the computing system being structurally modified to include a computer program product. Such structural modification may include any physical modification which allows the appropriate computer-executable instructions to be read from the computer program product. For instance, a computer program product may be an optical and/or magnetic storage medium.

The computer program product may include one or more non-transitory computer-readable media that is or are structured such that one or more processors of the computing system interpret the structure as being computer-executable instructions. The computer-executable instructions are structured such that, when executed by the one or more processors of the computing system, the computing system is caused to perform the method 200 for scheduling a group of work units across the computerized worker processes. For example, there may be as many active computerized worker processes as there are processing units in a computing system. For instance, if there are four processors, there may be up to four workers.

The method 200 causes the workers to opportunistically share work. In particular, as one worker becomes available to do work, it can become a stealing worker and "steal" work from another worker (i.e., an owner worker) that currently is tasked with performing the work. Of course, "steal" is just a term of art in parallel processing implying that one stealing worker process may claim work that was previously designated to be performed by another owner worker process. In essence, the stealing worker claims ownership of work units from an owner worker, thereby relieving the owner of having to perform the stolen work. This description will return to the method 200 of FIG. 2, after discussion of FIG. 3.

Figure 3:
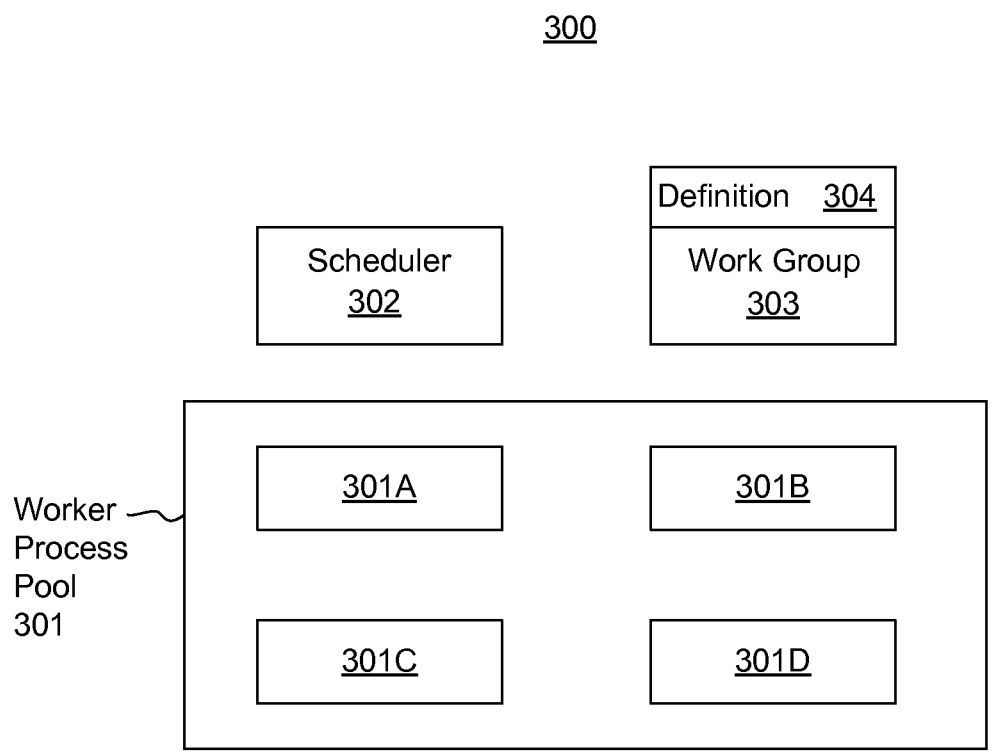
FIG. 3 illustrates a multi-worker environment in which the principles described herein may operate.

FIG. 3 illustrates an environment 300 in which the principles described herein may operate. The environment 300 may be, for example, within the computing system 100 of FIG. 1. The environment includes a pool 301 of worker processes, up to one active worker process per available processor. In the illustrated environment, the worker process includes four active workers 301A, 301B, 301C and 301D, being implemented by, for example, four processors in a multi-processor computing system. Although the environment 300 is illustrated as including a specific fixed number of active workers, the principles described herein may operate in dynamic systems in which the number of active workers is not pre-determined and may vary. For instance, the environment 300 might begin with four active workers, but may be diminished down to three at some point, or may be increased to seven, and so forth.

A scheduler 302 is also provided which identifies an initial definition 304 of a group 303 of work units to be completed. The initial definition 304 may, however, be altered by one or more other worker processes that steal some of the work units from the group 303 of work units. As an example, the initial definition 304 might be, for example, a range of identifiers for work units to be completed in sequence in the range starting with a beginning identifier and ending with an ending identifier.

The scheduler 302 identifies the work group definition 304, and then causes one of the workers (e.g., worker 301A) to be assigned to the group 303 of work units. The assigned worker 301A then becomes the owner of the group 303 of work units and, unless some of the work is stolen, will continue processing through the work units until the worker uses the definition 304 to determine that it has completed all of the work units. For instance, if the definition 304 identified one thousand work units ranging from identifier 1 to identifier 1000 (i.e., was represented as a range of identifiers), the worker 301A would begin with the work unit having identifier 1, and then proceed through each work unit sequentially until the worker 301 completes the work unit having identifier 1000. At that point, the entire work group 303 has been processed.

However, in the opportunistic work stealing embodiments described herein, it is likely that one or more steal events may occur in which a stealing worker is available to do work and thus decides to steal work from the worker 301A by stealing work units from the group 303 of work units. Whenever a stealing worker steals from the work group 303, the stealing worker changes the definition 304 of the work group 303 such that the worker 301A initially tasked with completing the work group 303 does not complete the stolen work. Rather, the stealing worker becomes the owner of the stolen work.

For instance, take the example in which worker 301A is tasked with completing a group (which will be referred to as "group A") of work units 1 through 1000. While worker 301A is working, worker 301B is looking for work and steals work units 501 through 1000 group (which will be now refer to as "group B"). In response to this stealing event, the definition of group A is changed to alter its range end from 1000 to 500. Thus, group A is redefined as work units 1 through 500, and now there is a group B that is defined as work units 501 through 1000. Of course, this assumes that the work is split at the mid-point of the range, which is the case in this example for the sake of simplicity only. The example might just as easily have been that group A is redefined as work units 1 through 600 instead, or perhaps group A is redefined as work units 1 through 400. The precise cut-off point is not critical to the principles described herein.

This process may be repeated. For instance, suppose worker 301C is available for work and decides to steal work from group A and from worker 301A. Worker 301C might steal work units 251 through 500 (referred to as "group C"), changing the definition of group A to work units 1 through 250.

Likewise, worker 301D may decide to steal work from group B and from worker 301B. Worker 301D might steal work units 7M through 1000 (referred to as "group D") from group B thereby redefining group B as being work units 501 through 750.

Whenever a stealing worker steals from an owner worker, it is not necessary for the owner worker to stop working. Instead, the owner worker continues working on its group of work units, and just stops working whenever the end of the work units (as then defined) is encountered. Thus, even though work group A was initially defined as work units 1 through 1000, by the time the worker 301A finally completed work unit 250, the work group A might have be altered to include just work units 1 through 250. Thus, having completed the final work unit in the group as it was then defined, the worker 301A can consider its work complete. Incidentally, once worker 301A becomes available, it is possible that one or more of the other work groups B, C, and D are still being worked on by their respective workers 301B, 301C, and 301D. The worker 301A may thus steal work back from another worker.

In this example, three steal events caused the initial work group A (which constituted work units 1 through 1000) to be divided into four work groups A (work units 1 through 250), B (work units 251 through 500), C (work units 501 through 750), and D (work units 751 through 1000). Once a work group is completed, there may be opportunities for coalescing the work group results with neighboring work group results.

For instance, once work group A is completed, the results of work group A may be 1) coalesced with just work group B if work group B has been completed and not yet coalesced with work group C results, or 2) coalesced with the coalesced results of work group B and C if work groups B and C have been completed and coalesced, or 3) coalesced with the coalesced results of work group B, C and D if work groups B, C, and D have been completed and coalesced. Alternatively, if work group B is not yet completed, the results of work group A may simply be prepared such that a worker may find the results of work group A for later coalescing.

In addition, once work group B is completed, the results of work group B may be coalesced with the results of work group A if work group A is completed. Alternatively, the results of work group B may be coalesced with the results of work group C or the coalesced results of work groups C and D, if available. If work groups A and C are not yet completed, then the results of work group B may be prepared and packaged for later coalescing with neighboring results.

Likewise, once work group C is completed, the results of work group C may be coalesced with neighboring results from group D and/or neighboring results from group B, or from the coalesced results of group A and B, whichever is available.

Finally, once work group D is completed, the results of work group D may be coalesced with neighboring results from group C, either group C alone, or the coalesced results of group C with other groups.

Coalescing may be coordinated between neighboring workers in accordance with some policy. However, the principles described herein are not limited to the type of coalescing of results, which may depend on the implementation.

FIG. 2 illustrates a flowchart of a method 200 for scheduling a group of work units. The method 200 may be performed recursively such that groups that are formed from stolen work may themselves be stolen from, and so forth, for any level of depth. The method 200 may be performed for any given work group, whether the initial work group (e.g., work units 1 through 1000 referring to the above example), or whether the work group was formed from stolen work from yet another work group (e.g., work units 501 through 1000 were formed as a new work group in the above example).

First, the worker initiates processing (act 211) of a work unit group that is initially defined, but which definition may be altered. For instance, the work unit group might be the initial parent group of work units, or the work unit might have been formed by a previous steal operation. In any case, the owner worker uses the definition of the work unit group to determine when all of the work units in the group of work units have been completed. That definition may be altered due to steal operations prior to the owner worker completing the work unit group.

The owner worker continues processing (act 212) of the group of work units. If the owner worker encounters the end of the work unit group as defined (Yes in decision block 213), then the owner worker may stop processing the work unit group (act 214), even if the definition has been altered to cause the owner worker to complete less of the work unit group than was initially defined. If the owner worker process does not encounter the end of the work unit group (No in decision block 213), then the owner worker continues to work on the work unit group (act 212).

While the owner worker is processing the work unit group, another worker may steal work from the work group (act 221) and thus change the work group definition (act 222) of the work group stolen from. The next time the method 200 determines whether the end of the work group is encountered (decision block 213), the altered definition will be used to make the determination. From the owner worker's perspective, the owner worker simply proceeds sequentially through the work units unit the end of the work group is encountered. The owner worker is not disturbed every time a steal occurs, and is not as affected by how many times a steal occurs.

As previously described, once the owner worker has completed processing of a work group (act 214), the results may be coalesced with neighboring results if the results are order sensitive, or with any of the results of the result are not order sensitive. The owner worker may contribute to the coalescing (act 215). For instance, the owner worker may decide that it or another worker is to coalesce the results, or may package the results for later coalescing by another process.

If the owner worker itself performs the coalescing, then the worker process may coalesce with any neighboring result. There is no requirement that the worker process coalesce with the same work unit group from which it previously stole work.

Figure 4A:
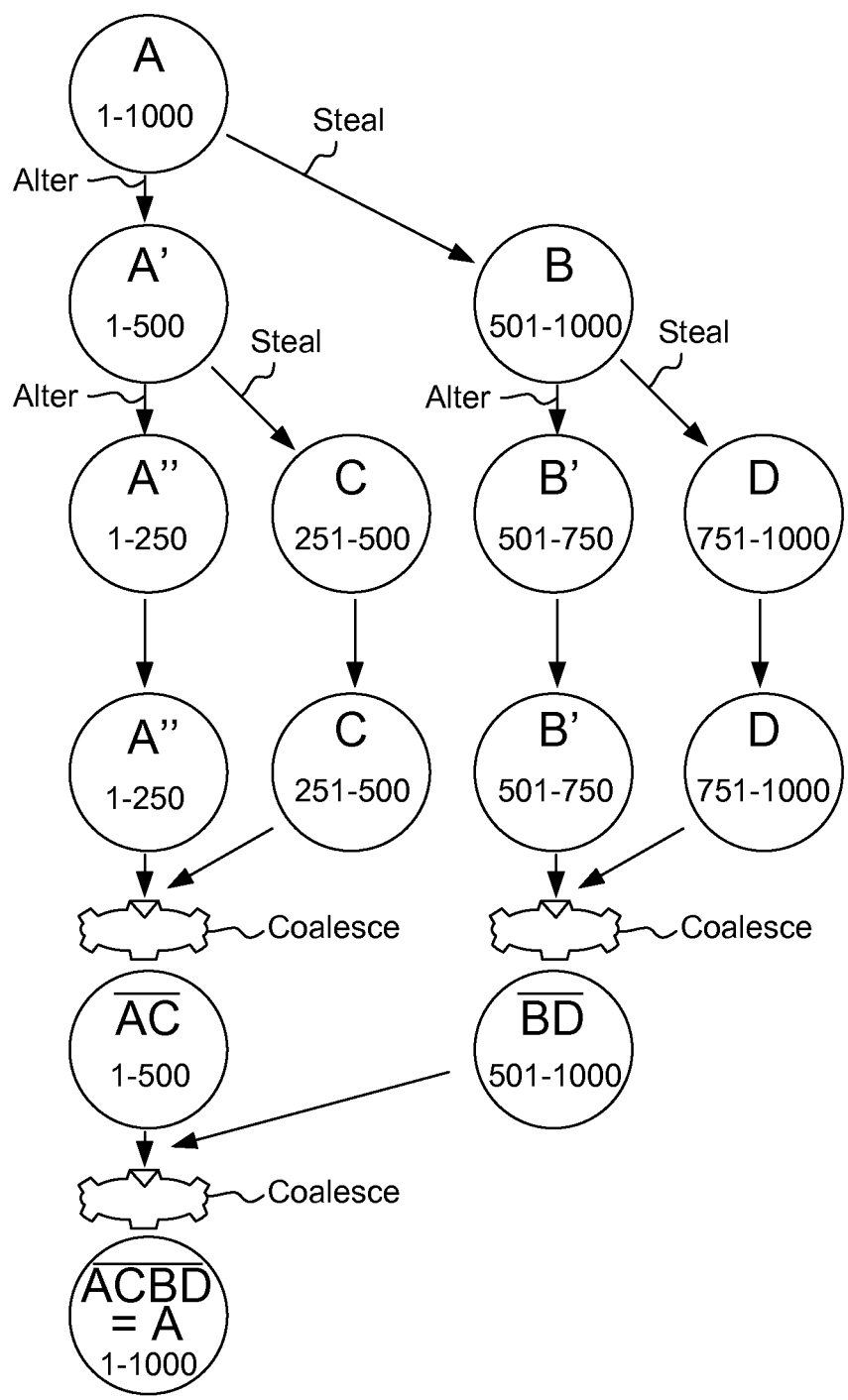
FIG. 4A illustrates an example stealing and coalescing pattern in which the workers coalesce using the same pattern used to steal.

For example, FIG. 4A illustrates a timeline in which the stealing worker that completed group C does coalesce with the group A from which the worker had stolen work from to form group C, and in which the stealing worker that completed group D does coalesce with the group B from which the worker had stoke work from to form group D.

In FIG. 4A, group B (work units 501-1000) is formed from work stolen from group A (work units 1 through 1000) to form group A' (work units 1-500). Then, group C (work units 251 through 500) is formed from work stolen from group A' to form group A" (work units 1 through 250). Once group A" and group C are completed, the results of group C are coalesced with the results of group A" (from which group C was formed) to form coalesced results AC (work units 1 through 500). Likewise, group D (work units 751 through 1000) is formed from work stolen from group B to form group B' (work units 501 through 750). Once group B' and group D are completed, the results of group D are coalesced with the results of group B' (from which group D was formed) to form coalesced results BD (work units 501 through 1000). Ultimately coalesced results AC are coalesced with coalesced results BD to obtain the final results.

Figure 4B:
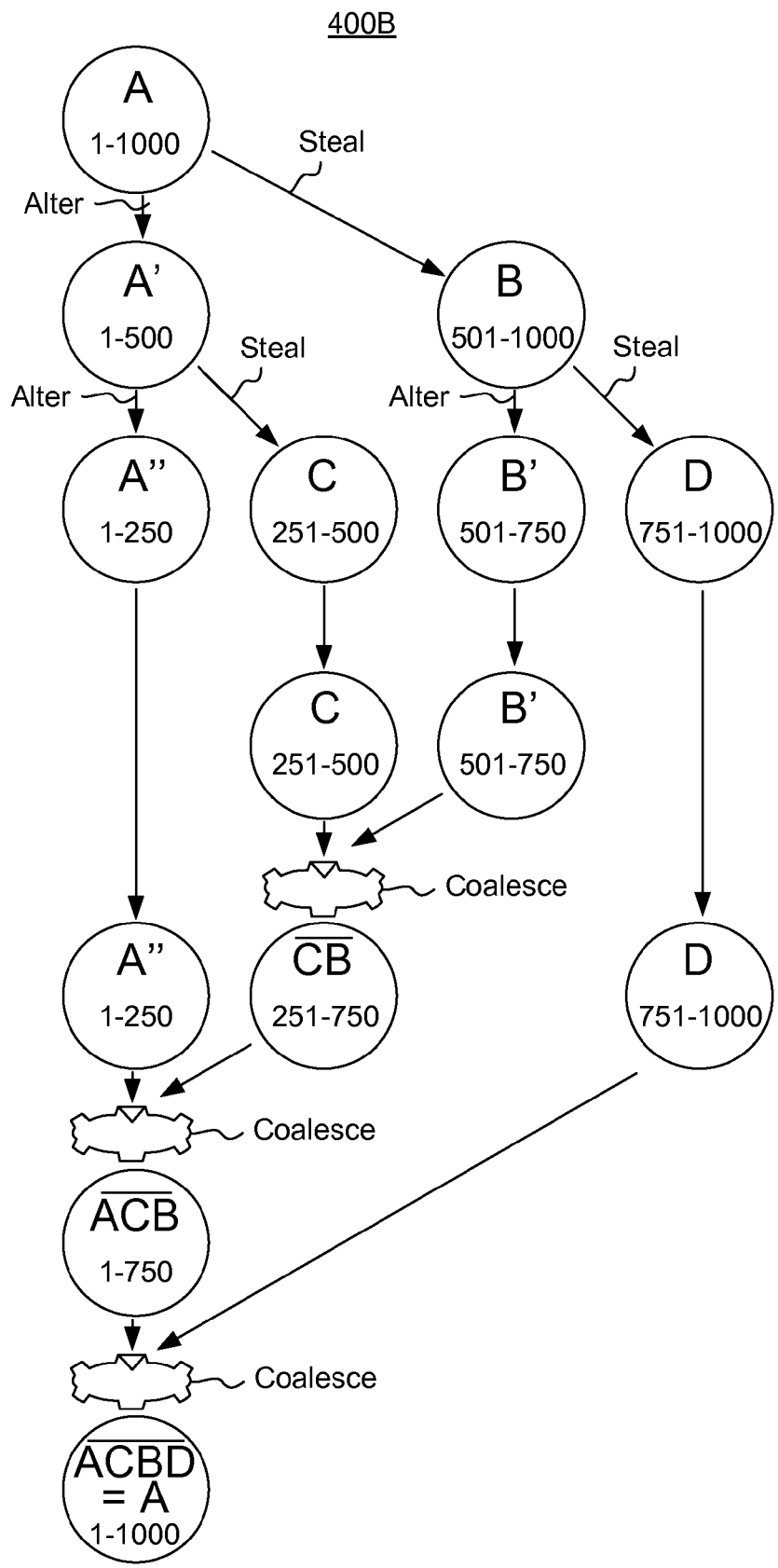
FIG. 4B illustrates an example stealing and coalescing pattern in which the workers do not coalesce using the same pattern used to steal.

In FIG. 4B, on the other hand, coalescing takes a different path than stealing, demonstrating that not only is the work stealing process opportunistic and flexible, but the coalescing process is as well. Just as in FIG. 4A, in FIG. 4B, group B (work units 501-1000) is formed from work stolen from group A (work units 1 through 1000) to form group A' (work units 1-500). Then, group C (work units 251 through 500) is formed from work stolen from group A' to form group A" (work units 1 through 250). Likewise, group D (work units 751 through 1000) is formed from work stolen from group B to form group B' (work units 501 through 750). However, once all work from group C and B is completed, the results from those two groups are coalesced into group CB (work units 251 through 750) even though neither was formed by a stealing operation from the other. Once the results from group A are available, the results from group CB may be coalesced with the results of group A to form group ACB (work units 1 through 750). Then, once the results from group B are available, the results from group ACB may be coalesced with the results of group D to form group ACBD, which is in the proper sequential order to reconstruct the results of work units 1 through 1000 in sequence.

FIGS. 5A through 5F illustrate a progression in a work-stealing environment with three processors 501, 502 and 503 and one large set of work units that may be executed in parallel. The processors are represented by the large chevrons. Within each processor, there is one active worker at a given time, represented by the intermediate-sized chevrons. Within each active worker, there are a number of work units (represented by the small chevrons) that are planned (at least at that time) to be performed sequentially by the worker. Time proceeds forward from FIGS. 5A through 5F. The cross-hatched area shows the time and processing that have already elapsed at the point of time captured in the corresponding figure.

Figure 5A:
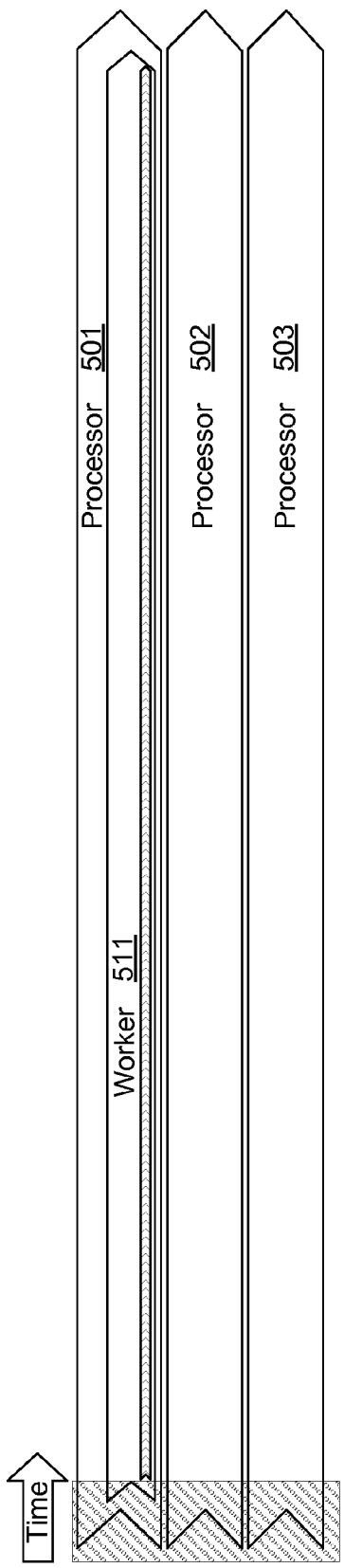

In FIG. 5A, the system is at the start of a set of work. At this point in time, all of the work units are assigned to worker 511 associated with processor 501. Processors 502 and 503 were perhaps busy at the time of initial scheduling and so were not initially assigned any work by the scheduler.

Figure 5B:
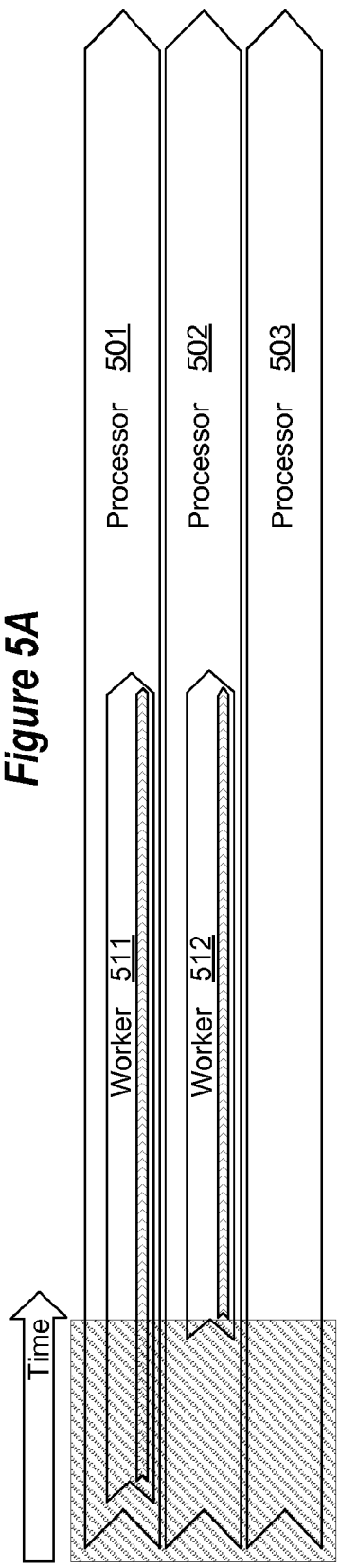

Referring to FIG. 5B, the worker 511 of processor 501 has completed a certain number of work units. At this point, processor 502 becomes available to help executing the work units and a worker 512 is associated with processor 502. The worker 512 then steals some of the work units previously assigned to the worker 511. Note that the number of work units scheduled to the worker 511 has dramatically dropped as the new worker 512 has stolen a large number of work units.

Figure 5C:
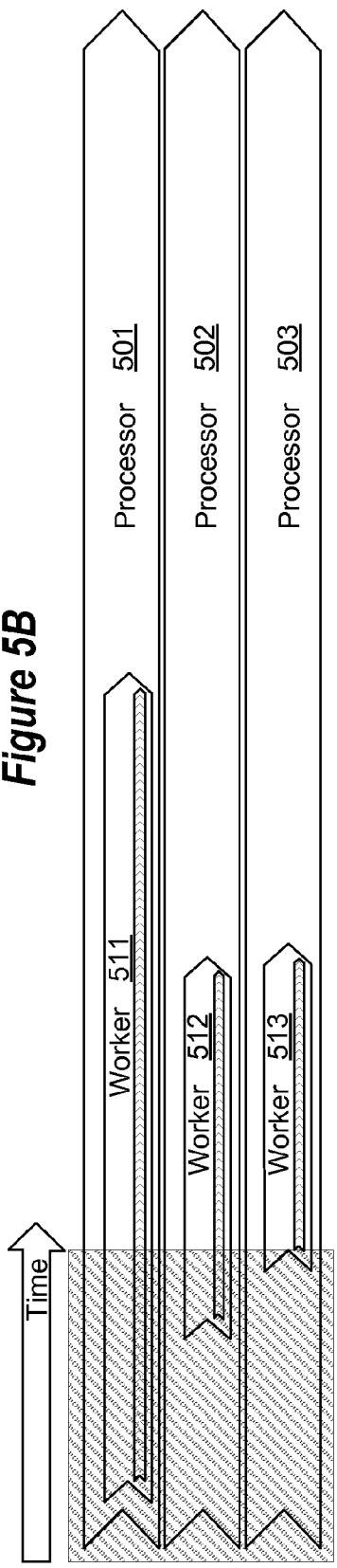

Referring to FIG. 5C, a short while later, another processor 503 becomes available and its worker 513 comes along to steal some work. In the case of FIG. 5C, the worker 513 has stolen work units from the worker 512 of processor 502.

In FIG. 5D, enough time has elapsed that worker 512 has completed its group of work units. At the time of completion, the processor 502 is available for work, and thus another active worker 514 is created to continue work stealing. In this case, worker 514 steals work from worker 511 even further reducing the amount of work that the worker 511 has to do.

In FIG. 5E, the worker 513 has completed its work, allowing the processor 503 to generate another worker 515 that is available to steal work. In this case, worker 515 steals work from worker 511.

In FIG. 5F, enough time has passed that all of the workers 511 through 515 have completed their work. As can be seen comparing FIGS. 5A through 5F, even with the extra processors 502 and 503 not joining the work effort from the start, the amount of time required to finish the work is significantly lowered.

Note that these FIG. 5A through 5F show a very basic example. The separate workers on processor 502 and processor 503 show the different stealing events. In fact, the way the executors are graphically displayed, the cost of a steal is more than 3 work units (just due to the graphics). This is not usually the case. However, as stealing happens in batches and work units are the work quanta, stealing stops when the work quanta gets below a steal threshold. Since the scheduler does not assume work units are of equal duration, the absolute minimum quanta could be one work unit. In practice, this may not happen when work unit sizes are small as the stealing operation would have noticed the work retirement rate caused a "missed" steal opportunity and thus signals an end to the stealing attempt.

Also, in the example of FIGS. 5A through 5F, there are no two steal operations that occur at the same time. However, the principles described herein are not limited to such a condition, provided that there are multiple stealing workers that are available to steal work at the same time as there are multiple working workers that can be stolen from. As an example, in FIG. 4B, there can be potentially two stealing operations happening at the same time; namely, a steal operation from A' producing A" and C, and another steal operation from B producing B' and D.

Figure 6:
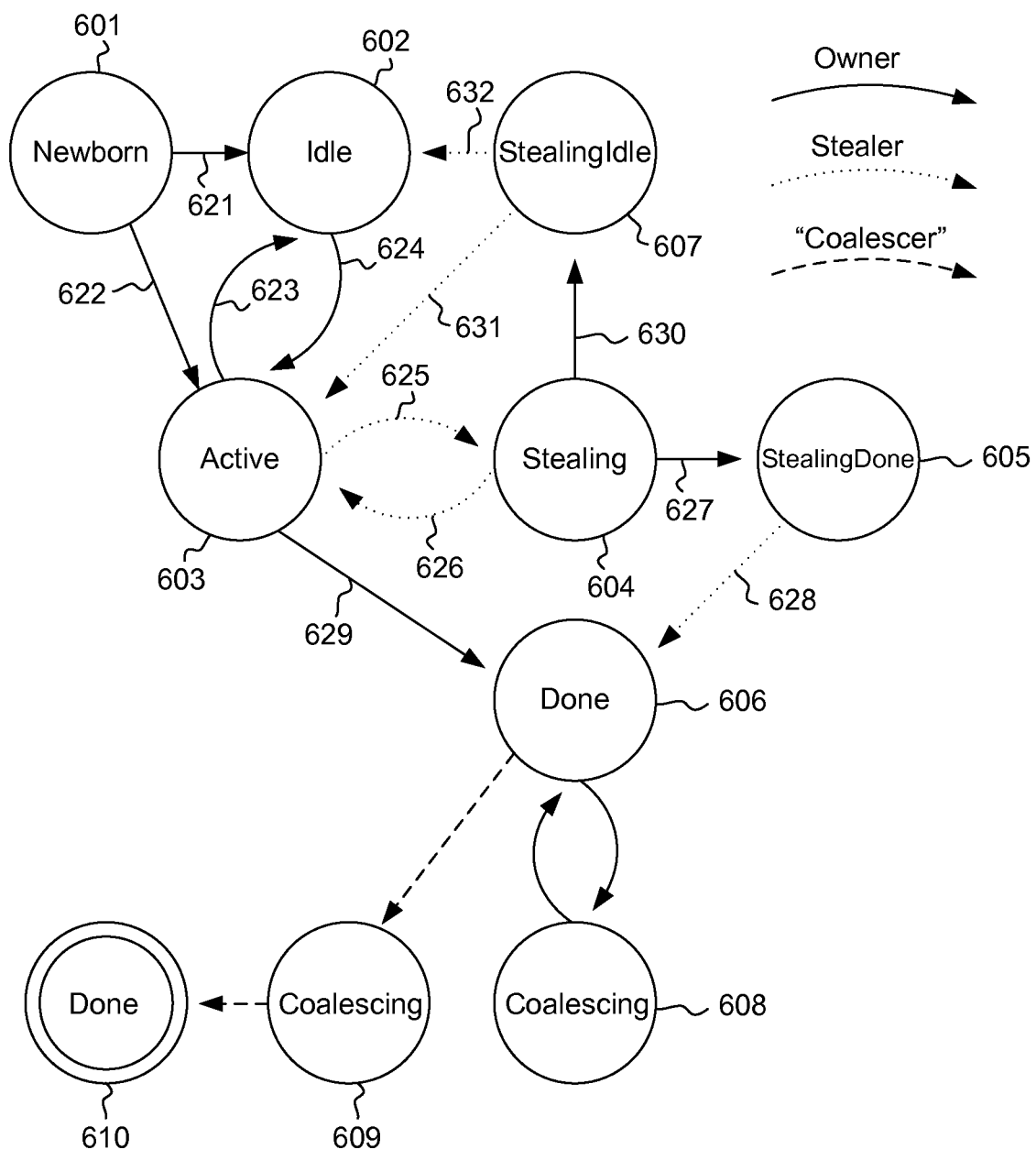
FIG. 6 illustrates a state diagram showing state transitions associated with a work unit group.

FIG. 6 illustrates a state diagram 600 of the processing of a work group. In newborn state 601, the work unit group is created. This may happen when the work unit group has been identified by the scheduler as a new group of work to be performed. This may also happen, for example, when a work group is created out of a steal operation from another work group.

Initially, a worker might not be ready to be assigned to the work unit group, in which case the work unit group will transition 621 to an idle state 602. Alternatively, if a worker is ready for immediate assignment, the work unit group state may immediately transition 622 from newborn state 601 to the active state 603. If, for whatever reason, the work unit group is in the idle state 602, the work unit group may transition 623 to active state 603 when a worker is assigned to the work unit group. If, for whatever reason, a worker discontinues work on the work unit group before the work unit group is completed, the work unit group transitions 624 from active state 603 to idle state 602. If the owner worker determines that the work for the work unit group is completed, then the owner worker transitions 629 the work unit group from the active state 603 to the done state 606. The composition of the transition arrows represents which process is causing the transition. Thus far, all of the transitions 621 through 624 are represented by solid lines, representing that the owner worker is responsible for causing the transition.

While in the active state, a stealing worker may steal from the work unit group, thereby causing a transition 625 from the active state 603 to a stealing state 604. Once the stealing is completed (e.g., the work unit group has been redefined), the work unit group may transition 626 from the stealing state 604 back to the active state 603.

While the work unit group is in the stealing state 604, the owner worker is still continuing work on the work unit group. Accordingly, in a first fringe case, it is possible that while the work unit group is in the stealing state 604, that the owner worker may complete the work unit as newly defined. If the owner worker completes work on the work unit group, and notices that the work unit group is in the stealing state 605, then the owner worker transitions 627 the work unit group state from the stealing state 604 to the stealingdone state 605. Once the stealing worker has completed stealing, if the stealing worker notices that the work unit group is now in the stealingdone state 605, then the stealing worker may transition 628 the work unit group state from stealing done state 605 to done state 606. After all, the owner worker may no longer exist if the work has been completed, and so the stealing worker assists in transitioning the work unit state to the done state 606.

In a second fringe case, it is possible that while the work unit group is in the stealing state 604, that the owner worker may abandon the work unit group. For instance, perhaps the owner worker, or a processor on which the owner worker was running, was preempted. If the owner worker abandons work on the work unit group, and notices that the work unit group is in the stealing state 605, then the owner worker transitions 630 the work unit group state from the stealing state 604 to the stealingidle state 607. Once the stealing worker has completed stealing, if the stealing worker notices that the work unit group is now in the stealingidle state 605, then the stealing worker may have several options. A first option is to take on ownership of the work unit group, in which case the stealing worker transitions 631 the work unit group state from the stealingidle state 607 to the active state 603. Alternatively, the stealing worker may transition 632 the work unit group state from stealingidle state 607 to idle state 602, allowing other available workers to claim ownership of the work unit group at a later time.

Once the work unit group is completed in done state 606, the work unit group may be coalesced 608 with neighboring work unit groups. As the coalesced work becomes larger and larger, eventually the coalesced work will be all of the work to be performed (state 609), at which point, processing may cease (state 610) on the work group.

Accordingly, the principles described herein permit efficient and opportunistic work sharing. The sharing is efficient in that stealing may occur without central coordination. Instead, stealing processes may steal work without asking permission, nor even notifying the owner worker. Thus, workers are often assisted in their work without having to be notified of that assistance, and without having to alter the logic by which the owner worker goes about completing its work. From the owner worker perspective, the owner worker simply performs its work until it encounters the end of its work unit group.

As an additional advantage, note that the opportunistic work stealing paradigm described herein makes it much more likely that any given worker is going to process work units in sequence, rather than randomly. Accordingly, rather than having to process each work unit comprehensively, the worker can, in some cases, use the results from the processing of the prior work unit to assist in the processing of the next work unit. This is especially helpful in cases in which the processing of prior work unit in a sequence produces a result that is helpful to the processing of the next work unit in the sequence. Thus, in these situations, processing of the work units can be made more efficient.

Furthermore, although the environment described herein has multiple worker processes, the work stealing paradigm described herein may also operate with just a single worker process. In that case, there would be no actual stealing going on. However, there is very little cost to allowing the environment to operate regardless of whether there is stealing happening or not, since most of the processing associated with stealing is performed at the time that stealing occurs, and then mostly by the stealing worker. Thus, there need not be separate code for a case in which there is a single worker process (and no stealing), and the case in which there are multiple worker processes (with stealing). This simplifies code management.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical storage devices that are distinguished from communications media having stored thereon computer-executable instructions that are structured such that, when executed by one or more hardware processors of a computing system, the computer-executable instructions cause the computing system to perform a method for scheduling a group of work units across a plurality of computerized worker processes, the method comprising:

an act of instantiating a first worker process at a first hardware processor and instantiating a second worker process at a second hardware processor as part of a worker process pool, the first and second worker processes having no assigned work units upon instantiation;

an act of adding a plurality of work units to a first definition of work units that are to be completed by the worker process pool, wherein the first definition of work units is structured such that the first definition may be altered by one or more worker processes;

an act of assigning the first worker process to the first definition of work units, thereby causing the first worker process to initiate processing of work units that are in the first definition, wherein the first worker process is configured to process each work unit in the first definition until all work units in the first definition have been completed, and such that the first worker process initiates processing of the plurality of work units of the first definition, and wherein the first definition of work units is defined as a range of work units, such that the first worker proceeds sequentially through the range of work units from the beginning of the work units towards the end of the range of work units, and for at least two sequential work units in the first definition, the first worker process uses a result from a prior work unit of the at least two sequential work units to assist in processing of a next work unit of the at least two sequential work units;

subsequent to initiating processing of the first definition of work units by the first worker process, an act of the second worker process determining that a second definition that is associated with the second worker process has no associated work units and that the second worker process therefore has no work units to process;

based on the second worker process determining that the second worker process has no work units to process, an act of the second worker process stealing one or more work units from the first definition, including the second worker process modifying the first definition to remove one or more first work units from the first definition, resulting in an updated first definition, and causing the one or more first work units that were removed from the first definition to be added to the second definition for processing by the second worker process, wherein when the second worker process steals from the first definition the second worker process alters the first definition by truncating the range of work units by changing the end of the range of work units; and subsequent to the second worker process stealing the one or more first work units from the first definition, an act of the first worker process using the updated first definition to determine that the first worker process has completed all work units that are associated with the first definition.

2. The computer program product in accordance with claim 1, the method further comprising:

subsequent to the act of the first worker process using the updated first definition to determine that the first worker process has completed all work units that are associated with the first definition, an act of the first worker process contributing towards the coalescing of results of processing of the first worker with a result of processing of a neighboring group of work units of the first definition to create coalesced results.

3. A method, implemented in a computer system that includes a plurality of hardware processors, for scheduling a group of work units across a plurality of computerized worker processes, the method comprising:

an act of instantiating a first worker process at a first hardware processor and instantiating a second worker process at a second hardware processor as part of a worker process pool, the first and second worker processes having no assigned work units upon instantiation;

an act of adding a plurality of work units to a first definition of work units that are to be completed by the worker process pool, wherein the first definition of work units is structured such that the first definition may be altered by one or more worker processes;

an act of assigning the first worker process to the first definition of work units, thereby causing the first worker process to initiate processing of work units that are in the first definition, wherein the first worker process is configured to process each work unit in the first definition until all work units in the first definition have been completed, and such that the first worker process initiates processing of the plurality of work units of the first definition, and wherein the first definition of work units is defined as a range of work units, such that the first worker proceeds sequentially through the range of work units from the beginning of the work units towards the end of the range of work units, and for at least two sequential work units in the first definition, the first worker process uses a result from a prior work unit of the at least two sequential work units to assist in processing of a next work unit of the at least two sequential work units;

subsequent to initiating processing of the first definition of work units by the first worker process, an act of the second worker process determining that a second definition that is associated with the second worker process has no associated work units and that the second worker process therefore has no work units to process;

based on the second worker process determining that the second worker process has no work units to process, an act of the second worker process stealing one or more work units from the first definition, including the second worker process modifying the first definition to remove one or more first work units from the first definition, resulting in an updated first definition, and causing the one or more first work units that were removed from the first definition to be added to the second definition for processing by the second worker process, wherein when the second worker process steals from the first definition the second worker process alters the first definition by truncating the range of work units by changing the end of the range of work units;

subsequent to the second worker process stealing the one or more first work units from the first definition, an act of the first worker process using the updated first definition to determine that the first worker process has completed all work units that are associated with the first definition; and based on the first worker process determining that the first worker process has completed all work units that are associated with the first definition, an act of the first worker process stealing one or more work units from the second definition, including the first worker process modifying the second definition to remove one or more second work units from the second definition, resulting in an updated second definition, and causing the one or more second work units that were removed from the second definition to be added to the first definition for processing by the first worker process.

4. The method in accordance with claim 3, further comprising:

subsequent to the act of the first worker process using the updated first definition to determine that the first worker process has completed all work units that are associated with the first definition, an act of the first worker process contributing towards the coalescing of results of processing of the first worker with a result of processing of a neighboring group of work units of the first definition to create coalesced results.

5. The computer program product in accordance with claim 1, further comprising:

based on the first worker process determining that the first worker process has completed all work units that are associated with the first definition, an act of the first worker process stealing one or more work units from the second definition, including the first worker process modifying the second definition to remove one or more second work units from the second definition, resulting in an updated second definition, and causing the one or more second work units that were removed from the second definition to be added to the first definition for processing by the first worker process.

6. A computer system, comprising:

a plurality of hardware processors; and one or more computer-readable media having stored thereon computer-executable instructions that, when executed by the one or more hardware processors, cause the computer system to schedule a group of work units across a plurality of computerized worker processes, including at least the following:

instantiating a first worker process at a first hardware processor and instantiating a second worker process at a second hardware processor as part of a worker process pool, the first and second worker processes having no assigned work units upon instantiation;

adding a plurality of work units to a first definition of work units that are to be completed by the worker process pool, wherein the first definition of work units is structured such that the first definition may be altered by one or more worker processes;

assigning the first worker process to the first definition of work units, thereby causing the first worker process to initiate processing of work units that are in the first definition, wherein the first worker process is configured to process each work unit in the first definition until all work units in the first definition have been completed, and such that the first worker process initiates processing of the plurality of work units of the first definition, and wherein the first definition of work units is defined as a range of work units, such that the first worker proceeds sequentially through the range of work units from the beginning of the work units towards the end of the range of work units, and for at least two sequential work units in the first definition, the first worker process uses a result from a prior work unit of the at least two sequential work units to assist in processing of a next work unit of the at least two sequential work units;

subsequent to initiating processing of the first definition of work units by the first worker process, the second worker process determining that a second definition that is associated with the second worker process has no associated work units and that the second worker process therefore has no work units to process;

based on the second worker process determining that the second worker process has no work units to process, the second worker process stealing one or more work units from the first definition, including the second worker process modifying the first definition to remove one or more first work units from the first definition, resulting in an updated first definition, and causing the one or more first work units that were removed from the first definition to be added to the second definition for processing by the second worker process, wherein when the second worker process steals from the first definition the second worker process alters the first definition by truncating the range of work units by changing the end of the range of work units;

subsequent to the second worker process stealing the one or more first work units from the first definition, the first worker process using the updated first definition to determine that the first worker process has completed all work units that are associated with the first definition; and based on the first worker process determining that the first worker process has completed all work units that are associated with the first definition, the first worker process stealing one or more work units from the second definition, including the first worker process modifying the second definition to remove one or more second work units from the second definition, resulting in an updated second definition, and causing the one or more second work units that were removed from the second definition to be added to the first definition for processing by the first worker process.

7. The system in accordance with claim 6, further comprising:

subsequent to the first worker process using the updated first definition to determine that the first worker process has completed all work units that are associated with the first definition, the first worker process contributing towards the coalescing of results of processing of the first worker with a result of processing of a neighboring group of work units of the first definition to create coalesced results.

* * * * *